Oct. 29, 1929.  G. C. CONN  1,734,006
DECKING DEVICE
Filed Sept. 2, 1927
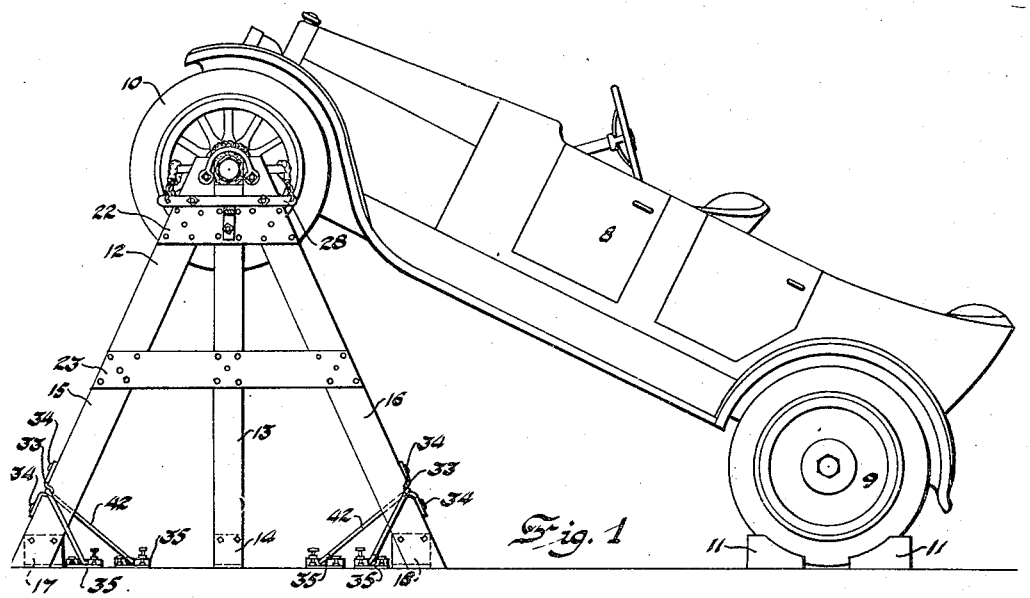
Fig. 1
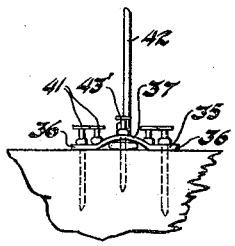
Fig. 5
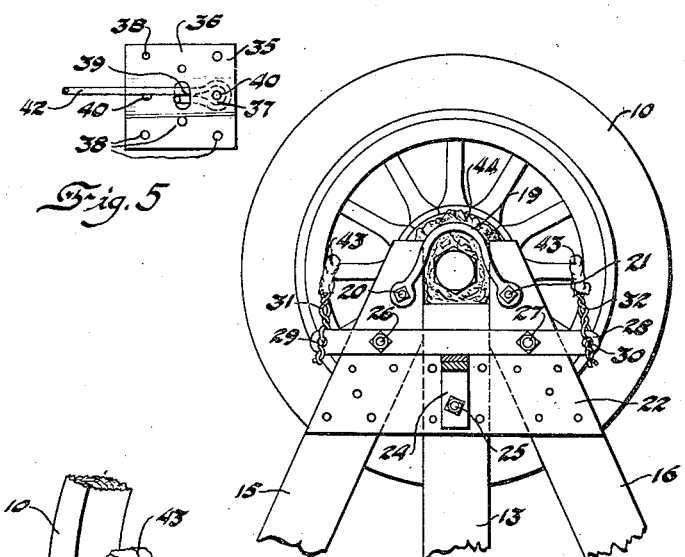
Fig. 4
Fig. 2
Fig. 3
Inventor
George C. Conn
By Blackmore, Spencer & Hulse
Attorneys Patented Oct. 29, 1929

1,734,006

UNITED STATES PATENT OFFICE

GEORGE C. CONN, OF FLINT, MICHIGAN, ASSIGNOR TO GENERAL MOTORS CORPORATION, OF DETROIT, MICHIGAN, A CORPORATION OF DELAWARE

DECKING DEVICE

Application filed September 2, 1927. Serial No. 217,290.

This invention relates to means for decking or semi-decking automobiles in freight cars or other conveyances and is an improvement on the device disclosed in U. S. Patent #1,605,579, issued November 2, 1926.

It is an object of this invention to provide an improved supporting and bracing means for use in supporting an automobile in proper position while in transit.

It is another object of the invention to provide means for securing an automobile against movement relative to its decking device.

Another object of the invention is to provide means for firmly securing a decking device against movement relative to the floor of the conveyance on which it is supported.

Other objects will be obvious from the following description of the preferred embodiment of my invention which is shown in the accompanying drawings in which:

Figure 1 is a side elevation of an automobile supported at its front end by a pair of my decking devices.

Figure 2 is an enlarged fragmentary side elevation of the upper end of one of the decking devices.

Figure 3 is a fragmentary perspective view of one end of the means for preventing lateral movement of the automobile with respect to the decking device.

Figure 4 is a view showing a foot plate secured to the floor of a conveyance.

Figure 5 is a top plan view of the foot plate shown in Figure 4.

In the drawing, the reference character 8 indicates an automobile having rear wheels 9 and front wheels 10, and which is supported at one end by a pair of my decking devices. The rear wheels 9 are prevented from rolling by the blocks 11, one of which is positioned in front of and one behind each of the rear wheels. The front end of the automobile is supported at a considerable height above the floor by the supports 12, one of which is positioned on each side of the automobile, with the hub cap of each of the front wheels resting on and supported by one of the supports.

Each support 12 includes an upright 13 secured to the floor of the car or other conveyance in which the vehicle is to be shipped by a bracket or the like 14 secured to the floor and the upright. The reference characters 15 and 16 indicate two inclined members secured to the floor on opposite sides of the upright by brackets or the like 17 and 18 secured to the floor and to the members 15 and 16 respectively. The members 15 and 16 converge upwardly and have bevelled ends bearing against opposite sides of the upper end of the upright and projecting thereabove. The upper end of the upright provides a rest for the front wheel hub-cap and the portions of the inclined members projecting above the upright prevent lateral movement of the caps. A loop 19 is secured at 20 and 21 to the members 15 and 16, respectively, and prevents upward movement of the hub-cap. The upright and the members 15 and 16 are secured together and braced by the cross members 22 and 23. A brace 24, connected to the upright and the cross member 22 at 25, is adapted to be attached to the side wall of the conveyance in which the automobile is being shipped to prevent side-sway of the upper end of the support.

Extending across and beyond the upright and the members 15 and 16 and secured to the members 15 and 16 at 26 and 27 is a steel cross member 28 which is perforated adjacent its ends as at 29 and 30. In order to prevent lateral movement of the automobile with respect to the supports, a wire 31 is passed around a spoke of the wheel 10 and through the opening 29 and the ends twisted together. It is obvious that the wire may first be inserted in the opening 29 and then its ends brought around a spoke and twisted together. Another wire 32 is similarly connected to another spoke and to the other end of the member 28. The wires are then twisted bringing the wheel tightly against the support. The connection between the wheel and the bar 28 can be easily broken when desired by cutting the wires 31 and 32.

On the outside and adjacent the lower end of each of the members 15 and 16 is provided a grooved plate 33 secured to the member by screws or the like 34. To the floor of the conveyance on the side of each member opposite to that carrying the plate 33 are secured two foot plates 35. Since all of these plates are identical a description of one will suffice for all. Each plate 35 has flat longitudinal edges 36 and a bowed-up longitudinally extending central portion 37. The longitudinal edges are perforated as at 38 and the bowed-up central portion has a large central perforation at 39 and smaller perforations 40 adjacent each end. Each plate is secured to the floor at the proper distance from its corresponding inclined member with the central ridge 37 in a line drawn from the member to the plate by securing means 41 (preferably double-headed nails) passing through the perforations 38 and into the floor. The looped end of a wire 42 is inserted into the perforation 39 and under one end of the bowed-up portion 37, with the loop registering with opening 40 in one of each pair of plates 35, and a double-headed nail or the like 43' is driven into the floor through the perforation 40 and the looped end of the wire, thus holding the end of the wire securely to the plate and the floor. The wire is then passed around the adjacent inclined member, resting in the groove in the plate 33 secured thereto, and its other looped end secured to the other plate of each pair in the same manner as the first end is secured to the first plate. When it is desired to remove the support or decking device 12 from the conveyance, the device described above is easily removed by cutting the wires 42 and removing the double-headed nails 41 and 43'.

To prevent marring of the automobile, the wires 31 are heavily padded as indicated at 43 at the points at which they contact with the wheel. For the same reason padding as indicated at 44 is inserted between the wheel and the hub and the upper part of each support.

Though my decking device or support has been shown and described as used to support only one end of the automobile, it is obvious that an automobile may be supported in fully decked position thereby by using four of these supports one at each wheel of the vehicle.

I claim:

1. In a device of the class described, means adapted to support a wheel of an automobile, and means, including a cross member on the first-mentioned means, to prevent lateral movement of the automobile with respect to the first-mentioned means.

2. In a device of the class described, means adapted to support a wheel of an automobile, and means, including a cross member having perforations adjacent its ends, to prevent lateral movement of the automobile with respect to the first-mentioned means.

3. In a device of the class described, means adapted to support a wheel of an automobile, and means, including a cross member on the first-mentioned means and a member secured to said cross member and adapted to be secured to said wheel, to prevent lateral movement of the automobile with respect to the first-mentioned means.

4. In a device of the class described, means adapted to support a wheel of an automobile, and means, including a cross member having perforations adjacent its ends, and a member passing through said perforations and adapted to be secured to said wheel, to prevent lateral movement of the automobile with respect to the first-mentioned means.

5. In a device of the class described, means to support a wheel of a vehicle, including two inclined members spaced apart and resting on a floor or the like at their lower ends and converging at their upper ends, means securing the lower ends of the members to the floor, means to prevent lateral movement of the automobile with respect to the inclined members, including a cross bar secured to the upper ends of the members and extending laterally therebeyond, and means to prevent spreading of the lower ends of the members, including a member passing around each of said inclined members and secured to the floor.

6. In a device of the class described, a supporting leg resting on a floor or the like, a notched plate secured to one side of the leg, and a member resting in said notch and secured to the floor.

7. In a device of the class described, a supporting leg resting on a floor or the like, a notched plate secured to one side of the leg, and a member resting in said notch and having looped ends secured to the floor on the side of the leg opposite to that having the notched plate.

8. In a device of the class described, a supporting leg resting on a floor or the like, a notched plate secured to one side of the leg, a member resting in said notch and having looped ends, and means to secure the looped ends to the floor, including a plate having a raised portion overlying each looped end, and means passing through said plate and said looped end.

9. In a device of the class described, an inclined supporting member resting on a floor or the like, a notched plate secured to the side of the member which is at an obtuse angle to the floor, plates having raised portions secured to the floor on the side of the member opposite to that carrying the notched plate, said second-mentioned plates having apertures in said raised portions, a member resting in the notch and having looped ends each underlying the aperture in the raised portion of one of the plates, and means passing through each of the apertures and looped ends securing the looped ends to the plate.

10. In a device of the class described, means adapted to support a wheel of an automobile, means adapted to be secured to said first-mentioned means and to be looped around a portion of the wheel to prevent vertical movement of the wheel with respect to the first-mentioned means, and means adapted to be secured to the first-mentioned means and to be looped around a portion of the wheel to prevent lateral movement of the wheel with respect to the first-mentioned means.

11. In a device in the class described, means adapted to support a wheel of an automobile, and a wire adapted to be looped around the wheel and the first-mentioned means and then to be twisted to prevent movement of the wheel with respect to the first-mentioned means.

12. In a device of the class described, means adapted to support a wheel of an automobile, and means to prevent movement of the wheel with respect to said first-mentioned means, including a cross member secured to said first-mentioned means, and wires adapted to be looped around opposite ends of said cross member and portions of the wheel and then to be twisted to prevent movement of the wheel with respect to the first-mentioned means.

13. In a device of the class described, a support including a member resting on a floor or the like and having in one side thereof a notch, and a member having a portion resting in said notch and another portion secured to the floor on the side of the first-mentioned member opposite that in which the notch is provided.

14. In a device in the class described, a support including an inclined member resting at one end on a floor or the like, and means to prevent movement of the inclined member with respect to the floor, including a member looped around said inclined member and having its ends secured to the floor on the side of the inclined member which makes an acute angle with the floor.

15. In a device of the class described, a support including an inclined member resting at one end on a floor or the like, and means to prevent movement of the inclined member with respect to the floor, including a member looped around said inclined member, and means, including a pair of plates, to secure the ends of the looped member to the floor on the side of the inclined member which makes an acute angle with the floor.

16. In a device of the class described, a support including a pair of inclined members resting at their lower ends on a floor or the like and converging at their upper ends, and means to prevent spreading of lower ends of said inclined members, including means looped around the lower ends thereof.

17. In a device of the class described, means adapted to support a wheel of an automobile, and a wire adapted to be looped around the wheel and the first-mentioned means, and then to have its ends twisted together to secure the wheel against movement with respect to the first-mentioned means.

In testimony whereof I affix my signature.

GEORGE C. CONN.